Patented May 26, 1953

2,639,968

UNITED STATES PATENT OFFICE 2,639,968

TANNING AGENTS AND METHOD OF PREPARATION

William B. Stoddard, Jr., Hamilton, Ohio, assignor to The Champion Paper and Fibre Company, Hamilton, Ohio, a corporation of Ohio No Drawing. Application July 25, 1950, Serial No. 175,887

8 Claims. (Cl. 8—94.31)

This invention relates to tanning compositions derived from the spent liquors resulting from the alkaline digestion of wood in the manufacture of wood pulp and to a method of preparing the same. Specifically the invention relates to tanning agents prepared from alkali-lignin as hereinafter defined.

Many proposals have been made to prepare tanning agents from "lignin." The term "lignin" unfortunately has been used loosely to cover both the material as it occurs in combination with cellulose in wood and other natural products, and the lignin compounds separated from wood and the like, such as those formed in the process of making pulp. These lignin compounds vary considerably in composition and properties depending upon the method of separation employed.

For example, the lignin compound occurring in the usual spent acid sulfite liquors is present there as a calcium lignosulfonate; it is soluble in acid solutions but is precipitated by lime and is infusible.

Another form of lignin, sometimes referred to as acid lignin, is the residue left when wood is subjected to an acid hydrolysis or is "saccharified" by treatment with strong sulfuric or hydrochloric acid. Acid lignin is insoluble in acid solutions, insoluble in dilute alkalies and is infusible.

Some of the lignin products derived from the spent liquors of the wood pulp industry have a certain degree of usefulness in the leather industry, but to the best of my knowledge, no successful tanning agents have been prepared except those from waste liquors from the sulfite process, and these are all used as supplements or extenders to the natural vegetable tans such as those extracted from oak, chestnut, quebracho, wattle, etc.

The raw material for the present invention is what may be termed "alkali-lignin." By alkali-lignin I mean the lignin derivatives formed when wood or other lignocellulosic material is subjected to hot alkaline digestion usually under pressure. It is present in the spent black liquor resulting from pulping wood by, for example, the soda process, the sulfate or kraft process, and the alkaline sulfite process. Although there may be some more or less minor differences in the specific constitution of the alkali-lignins, depending on whether they are derived from the soda, sulfate, or the alkaline sulfite process, I have found that all these alkali-lignins may be used as starting materials for the present invention.

The alkali-lignins as herein defined are soluble in 2% sodium hydroxide at room temperature. They may be precipitated by the addition of an acid or acidic material to the spent black liquor from the aforementioned alkaline pulping processes. The precipitated alkali-lignins melt generally at a temperature in the range of 160 to 210° C., depending upon the alkaline cooking process employed, the species of plant cooked, and the recovery cycle. Alkali-lignins will generally have an ultimate analysis of 64.5% to 68% carbon, 5.5% to 6% hydrogen, and a methoxyl content of from 11% to 20%. The alkali-lignins correspond in general to the material known as meta-lignin.

I have discovered that a new and highly reactive tanning agent is formed when aqueous-chlorine-treated alkali-lignin having a chlorine content of from 15% to 30% is mixed with a sulfite compound from the group comprising the alkali-metal sulfites, bisulfites, and meta-bisulfites and at some stage contacted with water; the sulfite compound can be added as such or can be formed in situ. Chlorine-treated alkali-lignin dissolves readily in a solution of sodium sulfite at room temperature. The tanning agents formed assay from 50% to nearly 100% tannin content on the basis of the chlorine-treated alkali-lignin, they have good solubility having no tendency to gel at concentrations normally employed in vat and drum tanning liquors and have a high degree of blendability with other vegetable tans in solutions of the usual tanning concentrations and pHs.

The invention is not limited to the combination of a sulfite compound and chlorine-treated alkali-lignin per se; the chlorine-treated alkali-lignin can be solubilized with an alkali and otherwise processed and the sulfite compound then added or formed in situ.

The tannin content values given throughout the specification have been determined according to the "standard hide powder test" described in the manual, Methods of Sampling and Analysis, American Leather Chemists Association, Proposed Methods, 1946, pages A–7 to A–13; the test solution of tanning agent was adjusted to a pH of 4.0± 0.5 in each determination. In brief, the test consists of agitating a standard amount of special hide powder with a solution of the tanning agent, filtering out the hide powder, and determining the percentage of agent removed by the hide powder; the standard time of contact between the hide powder and tanning agent solution is 10 minutes, and the tanning content values given herein were determined on a 10 minute basis unless otherwise specified.

The process of my invention is advantageously carried out as follows: "black liquor" resulting from an alkali digestion of wood or other lignocellulosic material is first treated with an acid or acidic material, such as for instance, sulfuric or hydrochloric acid, carbon dioxide, sulfur dioxide, etc. The black liquor may be used in the dilute form after the cellulosic pulp has been filtered off, but I prefer to use it after it has been partially concentrated as, for instance, in the multiple effect evaporators of the recovery system. As the pH of the black liquor is reduced to about 9 or 8 by the addition of the acid, alkali-lignin is precipitated in a form known as "sodium lignate." This readily salts out from the black liquor but can be dissolved in water.

The sodium lignate may be removed from the black liquor and treated with chlorine as hereinafter described, or more acid may be added to the black liquor to bring the pH down as low as 4 at which point a maximum yield of alkali lignin is obtained; this acid precipitated (at a pH below 7) alkali-lignin separates out as a dark somewhat slimy precipitate. This is then separated from the liquid by filtration or other means.

In case the black liquor is derived from a kraft or sulfate process I prefer to use sulfur dioxide as the acid material as sulfur dioxide supplies a source of sulfur in the recovery system of the black liquor processing. With black liquor from a soda process carbon dioxide is advantageous.

The alkali-lignin is next subjected to the action of chlorine. A suspension or solution in water as the case may be containing from about 3% to 10% of alkali-lignin is normally employed. Higher concentrations can be used, or if desired, the alkali-lignin can be treated in the form of a wet paste, but in general a relatively dilute slurry is preferred. Advantageously, if the alkali-lignin is in the acid precipitated form, it is reduced to fine particle size as by passing the slurry through a colloid mill.

When an aqueous solution of sodium lignate is used for the chlorine treatment, the hydrochloric acid, which is formed by reaction of chlorine with alkali-lignin, rapidly reduces the pH of the solution below 7 whereupon the alkali-lignin is precipitated. Further treatment with chlorine proceeds as when a slurry of acid precipitated alkali-lignin is used as the starting material.

The chlorine treatment is conveniently carried out by introducing chlorine gas into the suspension or solution of alkali-lignin; or the alkali-lignin can be added to an aqueous chlorine solution containing sufficient proportion of chlorine to carry out the desired reaction. Good agitation is desirable. From a study of the reaction rate it appears that one atom of chlorine together with an atom of oxygen is introduced into the lignin molecule rapidly. Additional chlorine enters the molecule more slowly.

The reaction of chlorine and alkali-lignin is continued until the alkali-lignin product analyzes 15% or more chemically combined chlorine on the dry weight of the product. I have discovered that the potential tanning properties of the alkali-lignin increase as the chlorine content increases above 15% until, at a chlorine content of about 25% to 30%, a maximum in potential tannin content is attained. This normally requires from 1 to 3 hours, but may require only a fraction of an hour or may take as long as 15 hours depending upon the rate of introduction of chlorine, and whether or not the reaction vessel retains the chlorine until it is consumed. This reaction may be carried out as a batch process or continuously and either at atmospheric pressure or above. Additional chlorine may be introduced into the product by severe treatment but with difficulty and with no substantial improvement in tanning content. At around 32% chlorine content the potential properties appear to decrease. A chlorine content of at least 20% is preferred in order to insure adequate solubility of the final product. It is characteristic of the products thus prepared that they are soluble in dilute solutions of mild alkalies at room temperature, for example, in a 2% solution of sodium carbonate.

The temperature of the chlorine treatment has not been found critical although cooling of the aqueous alkali-lignin system (either slurry or solution) may be desirable at times to remove the heat liberated in the reaction. Good results have been obtained starting with the system at room temperatures. The system is ordinarily cooled to maintain the temperature below 90° F., but good tanning materials can be produced over the temperature range of 32° to 140° F. As the temperature approaches 200° F. it becomes difficult to combine an adequate amount of chlorine with the lignin. Pressure facilitates the chlorine treatment; pressure of as low as 3 to 25 pounds above atmospheric speed the reaction.

As stated above the treatment of the alkali-lignin in water with chlorine also brings about an oxidation of the alkali-lignin composition. The reaction product ordinarily will contain from about 24% to 28% oxygen depending on the chlorine content, the higher oxygen content corresponding to a lower chlorine analysis and vice versa.

At the end of the chlorine treatment the insoluble reaction product is usually separated from the mother liquor, and if desired can be washed to remove hydrochloric acid. It is then reacted with and solubilized with a sulfite compound taken from the class consisting of alkali metal sulfites, bisulfites, and meta-bisulfites. The reaction goes readily at room temperature. There is reason to believe that in the chlorine treatment two atoms of chlorine and one atom of oxygen are introduced into each alkali-lignin unit. One of the chlorine atoms is readily reactive while the other is relatively non-reactive. As a result of the treatment with a sulfite compound apparently the reactive chlorine is replaced to give a product which is soluble in water in the acid pH range commonly used in vegetable tanning and on the alkaline side as well. A certain amount of chlorine remains in the product and cannot be readily removed even by heating with a strong caustic solution. In the case of a chlorine-treated alkali-lignin having an initial chlorine content of 25% to 30% on dry bases, the chlorine content remaining after dissolving in a solution of a sulfite compound will be about 15% to 18%, while a product having a chlorine content of 15% to 16% will, after treatment with a sulfite compound have a chlorine content of about 12%.

For the sulfite treatment I prefer to use sodium sulfite. Sufficient sulfite is added to dissolve the chlorine-treated alkali-lignin in water; this necessitates adding enough sulfite to react with any acid carried over from the chlorine step and to react with the replaceable chlorine. Ordinarily from 20% to 25% of sodium sulfite on the weight of the chlorine-treated alkali-lignin will put it in solution. Some increase in the tannin content of the chlorine-treated alkali-lignin is produced by increased amounts of sulfite but this is counterbalanced by introducing a larger percent of inorganic material; in a typical case increasing the sulfite from 25% to 45% increased the tannin content from 76% to 82%.

A suitable product consists of chlorine-treated alkali-lignin of 25% to 30% chlorine content after it has been washed and dried, mixed with about 25% of powdered sodium sulfite. The tanning properties of the material in this case are developed when the tanner prepares his solution. In recirculating systems such as are employed in sole leather tanning practice wherein the tannin depleted liquors are restrengthened and reused, the sulfite may accumulate and contribute toward this solubilizing action.

In any event after the chlorine-treated alkali-lignin is put in solution, the pH is adjusted to the value desired for the tanning operation.

Instead of adding sulfite directly to the chlorine-treated alkali-lignin, the chlorine-treated alkali-lignin may be first dissolved or hydrolyzed by means of alkali and then the sulfite added. This procedure raises the tannin content of the alkali hydrolyzed material; for example in one case the addition of 15% sodium sulfite raised the tannin content from 49% to 69%.

When chlorine-treated alkali-lignin is solubilized with an alkali substantial amounts of inorganic salts, particularly sodium chloride are formed. In certain tanning operations, such as the tanning of pickled splits or skins, "mordanting," and vegetable retan of chrome tanned hides, the presence of inorganic salts is not objectionable, and often salts are deliberately added to prevent undesirable effects in the leather such as undue swelling, etc. On the other hand, in the preparation of sole leather and for many other types of tanning, only a small amount of inorganic salt can be tolerated.

If chlorine-treated alkali-lignin, which has been solubilized (hydrolyzed) with alkali, is contacted with an aqueous acid solution having a pH below 3 and preferably below 2 the lignin derivative is substantially insoluble therein, whereas the salt and other impurities are soluble in the acid and can thus be removed. If the hydrolyzed product is first dried to form a finely divided material the extraction of the impurities with the acid is greatly facilitated.

The process of removing salt by the method described modifies the tanning properties of the hydrolyzed chlorine-treated alkali-lignin in that the rate of tanning is reduced. It is possible that the strong hydrochloric acid used in the process may, in some little understood manner, polymerize or otherwise change the alkali-lignin derivative to bring about the slower tanning rate. The addition of a sulfite to the acid extracted alkali-lignin derivative however will materially increase the rate of tanning. It also aids in increasing solubility and blendability with other tanning agents. The effect of sulfite is roughly proportional to the amount added; for example a particular chlorine-treated alkali-lignin, which had been solubilized with caustic, had a tannin content of 46%, 49%, 59%, and 62%, for 0%, 5%, 10%, and 15% of sodium sulfite on the weight of the chlorine-treated alkali-lignin.

When a solubilized chlorine-treated alkali-lignin has been treated with acid to remove salt, it then redissolves in water using a much reduced amount of sulfite and/or alkali than in the first solubilizing, since the reactive chlorine is no longer present; as a result the solution of resolubilized agent has a much lower inorganic content or ash.

The ultimate products after the chlorine and the sulfite treatment are superior tanning agents having a tannin content of from 50% to nearly 100% based on the dry weight of the chlorine treated alkali-lignin, as determined by the hide powder method. These values compare favorably with the better natural vegetable tanning.

Furthermore, the tanning agents of my invention produce high quality leather and are suitable for use in various vegetable tanning processes. They have been used alone and in blends with other commercial tans including quebracho, wattle, and sulfite spruce in operations such as chrome retan, mordanting, pickled skin and pickled flesh split tanning, etc. The leather produced with my agents has good resistance to tear and cracking, has a medium to light brown color, and is highly resistant to mold growth. No mold is encountered during the tanning processes, thereby eliminating the necessity of adding a disinfectant. Furthermore, the finished leather is moldproof.

The invention will be illustrated further by the following examples:

*Example 1*

Partially evaporated black liquor from a conventional sulfate digestion of southern pine chips was treated with carbon dioxide until the pH was lowered to about 9; it was then heated to about 190° F., allowed to cool, and the precipitate filtered out. This sodium lignate precipitate was dissolved in water to form a solution (sp. gr. of 1.018 at 74° F.) containing 4.5% solids (42 g. alkali-lignin per liter) and having a pH of about 8.5. The solution was fed into an enclosed continuous reaction chamber as a small stream while chlorine was simultaneously introduced through the same inlet and intimately blended with the solution with vigorous turbulence. The chlorine was introduced at the rate of about 8 pounds per hour and the sodium lignate solution at the rate of 17 gallons per hour. As the chlorine was introduced, hydrochloric acid was formed and the pH dropped immediately to a value well below 7 with concomitant precipitation of the alkali-lignin derivative as very fine particles. The reaction mixture, under a pressure of about 5 pounds above atmospheric, was retained in the reaction chamber for about 45 minutes at a temperature of about 78° to 82° F. The reaction slurry was then heated to about 167° F., filtered, reslurried at about 6% solids, heated to about 180° F. and filtered. The chlorine-treated alkali-lignin produced analyzed 25% chlorine. It was then dissolved in water at room temperature by adding 37.5% of sodium sulfite on its dry basis and agitating. This solubilized product when tested by the standard hide powder test for 10 minutes, 60 minutes, and 24 hours assayed respectively 70%, 86%, and 90% tannin content on the basis of the chlorine-treated alkali-lignin. A preparation of this type was used in a blend for the commercial tannage of pickled flesh splits; a good grade of commercial leather was produced.

*Example 2*

Partially concentrated black liquor from a conventional sulfate digestion of southern pine, 18° Baumé, was treated by introducing carbon dioxide until the pH was reduced to about 8.8–9.2. The liquor was then heated to about 180° F., allowed to cool, and the precipitate of sodium lignate was separated. This precipitate was dissolved in water to form a solution having a pH of about 8.5, a specific gravity of 1.018 at 74° F. and containing about 42 g. of alkali-lignin per liter. The solution was fed into an enclosed continuous reaction chamber as a small stream while chlorine was simultaneously introduced through the same inlet and intimately blended with the solution with vigorous turbulence. The chlorine was introduced at a rate of about 8 pounds per hour and the sodium lignate solution at the rate of about 17 gallons per hour. As the chlorine was introduced hydrochloric acid was formed and the pH dropped immediately to a value well below 7 with concomitant precipitation of the alkali-lignin derivative as very fine particles. The reaction mixture, under a pressure of about 6 pounds above atmospheric, was retained in the reaction chamber for about one hour at a temperature between 85° and 90° F. The reaction slurry was then filtered, reslurried in water at about 5% solids and room temperature, and filtered. The product analyzed 26% chlorine dry basis.

It was then made up as a 10% slurry in water and dissolved by adding sufficient sodium hydroxide to bring the pH up to 8.5 quickly and then holding at this pH for about 5 minutes by adding additional of caustic. The solubilized product tested by the standard hide powder test for 10 minutes, 60 minutes, and 24 hours, had a tannin content respectively of 49%, 67%, and 88%, based on the dry weight of the chlorine-treated alkali-lignin. The inorganic content of the soluble solids amounted to about 26%.

Sodium sulfite was then added to a portion of the solution in an amount equal to 15% on the weight of the chlorine-treated alkali-lignin. Tannin content determinations for 10 minutes, 60 minutes, and 24 hours, showed respectively 69%, 82%, and 90% tannin content based on the dry weight of the chlorine-treated alkali-lignin.

Another portion of the solution was acidified to a pH of 0.8 with hydrochloric acid, heated to 186° F., and filtered, the cake was reslurried in water at about 6% solids and a pH of about 1.5 (due to the retained acid), heated to about 182° F. and filtered.

The cake was dissolved in water by adding caustic to a pH of about 8.5. Hide powder tests run for 10 minutes, 60 minutes, and 24 hours, showed a tannin content respectively of 28%, 45%, and 75% based on the dry weight of the chlorine-treated alkali-lignin (acid precipitated and washed). The inorganic content of the soluble solids was now about 16% as compared to 26% for the previous solution. The chlorine-treated alkali-lignin after acid precipitation had a reduced rate of tanning as will be noted from the data on tannin content; however, upon adding to this solution of redissolved precipitated material, an amount of sodium sulfite equal to 15% of the acid precipitated, washed material (dry basis), the tannin content results for 10 minutes, 60 minutes, and 24 hours were raised to 34%, 62%, and 84%, same basis as above.

Example 3

A chlorine-treated alkali-lignin containing about 25% chlorine was prepared in the same manner as the chlorine-treated alkali-lignin in Example 1. The material from the chlorine step, after the filtering operations, was dissolved in water by addition of caustic to a pH of 8.5, then precipitated by the addition of hydrochloric acid to a pH of about 1, heated to about 180° F., filtered, reslurried in water, and filtered. Its ash content was about 1.7%. The washed material was dissolved in water at room temperature by adding sodium sulfite in an amount equal to 25% of its dry weight. Tannin content determinations run on this solution for 10 minutes, 60 minutes, and 24 hours, showed a tannin content of 54%, 65%, and 89% respectively based on the precipitated, washed lignin derivative, dry weight. This preparation was used to replace a conventional commercial vegetable tan in a blend employed in a commercial mordanting operation; the preparation produced the desired results in the leather very well, as the leather in subsequent operations processed in a very satisfactory manner and in the finished condition met the requirements for dress shoe upper-leather. The preparation was also used in a blend containing wattle and quebracho; pickled flesh splits were tanned producing very acceptable leather.

Example 4

A chlorine-treated alkali-lignin having a chlorine content of 24.5% was prepared by the same procedure as in Example 2. The reaction slurry from the chlorine-step was filtered, and the cake was dissolved in water at room temperature with agitation by adding sufficient caustic solution to impart a pH of 8.5. Sulfur dioxide was then introduced into the solution until its pH was about 5 and the solution was dried rapidly as a thin film on steam heated plate. Tannin content determinations run on a solution of the dried material for 10 minutes, 60 minutes, and 24 hours, gave values of 54%, 76%, and 94% respectively, based on the chlorine-treated alkali-lignin, ash-free dry weight.

The sulfite compounds can be used in various ways in preparing chlorine-treated alkali-lignin tanning agents. They can be used as mixtures or in any desired combination with an alkali; for example, it is sometimes desirable to dissolve the chlorine-treated alkali-lignin at pHs higher than those used in the tanning liquors and then use a bisulfite to lower the pH.

The ultimate analysis of the alkali-lignin and the chlorine-treated product is determined by standard analytical procedures except for chlorine content which is determined as follows:

One liter of the acid slurry from the chlorine-treating step carrying about 45 grams of suspended solids is filtered on a Buchner funnel, using vacuum. The filter cake is slurried with one liter of cold distilled water and filtered. This step is repeated once more. The filter cake is then allowed to air dry, after which it is powdered and used for analysis. A 0.5 gram sample of the chlorine-treated alkali-lignin is mixed with 2.5 grams of sodium carbonate in a nickel crucible, one ml. of water is added with mixing, and 2.5 grams of sodium peroxide is added in approximately 0.5 gram portions. The crucible is added in a cold muffle furnace and heated to 1300° F. The fusion mixture is allowed to cool somewhat, then about 2 grams of additional peroxide is added. After a second fusion the crucible is allowed to cool; the fusion mixture is dissolved in hot water and made up to 250 mls. in a volumetric flask. Aliquot portions of 50 mls. are acidified with nitric acid. A known excess of standard silver nitrate solution is added, about 5 mls. of nitrobenzene is introduced to immobilize the suspended silver chloride, and the excess silver nitrate is titrated with a standard potassium thiocyanate solution using ferric alum as the indicator.

The term "alkali-lignin" as used in the appended claims includes both the water soluble forms thereof, in particular, sodium lignate which is precipitated in a pH range of 8 to 9 and to the insoluble forms thereof, in particular to the material precipitated at a pH below 7.

The term "alkali" as used in the appended claims includes the alkali-metal hydroxides, carbonates, and bicarbonates.

I claim:

1. The process of preparing a tanning agent which comprises reacting alkali-lignin with chlorine in the presence of at least sufficient water to form a wet paste until said alkali-lignin contains from 15% to 30% of chemically combined chlorine, and subsequently reacting said chlorine-treated alkali-lignin with a compound from the group consisting of alkali-metal sulfites, bisulfites, and meta-bisulfites in the presence of water.

2. Process of preparing a tanning agent which comprises reacting alkali-lignin with chlorine in the presence of at least sufficient water to form a wet paste until said alkali-lignin contains from 15% to 30% of chemically combined chlorine, dissolving said chlorine-treated alkali-lignin in water by means of an alkali, and adding to said solubilized chlorine-treated alkali-lignin a compound from the group consisting of alkali-metal sulfites, bisulfites, and meta-bisulfites.

3. Process of preparing a tanning agent which comprises reacting alkali-lignin with chlorine in the presence of at least sufficient water to form a wet paste until said alkali-lignin contains from 15% to 30% of chemically combined chlorine, dissolving said chlorine treated alkali-lignin in water by means of an alkali, precipitating said chlorine-treated alkali-lignin from solution by the addition of an acid, and reacting said precipitate with a compound from the group consisting of alkali-metal sulfites, bisulfites, and meta-bisulfites in the presence of water.

4. Process of preparing a tanning agent which comprises reacting alkali-lignin with chlorine in the presence of at least sufficient water to form a wet paste until said alkali-lignin contains from 15% to 30% of chemically combined chlorine, dissolving said chlorine-treated alkali-lignin in water by means of an alkali, precipitating said chlorine-treated alkali-lignin from solution by the addition of an acid, dissolving said precipitate in water by the addition of an alkali, and reacting said resolubilized chlorine-treated alkali-lignin with a compound from the group consisting of alkalimetal sulfites, bisulfites, and meta-bisulfites in the presence of water.

5. Process of preparing a tanning agent which comprises reacting alkali-lignin which has been recovered from the spent liquors of an alkaline digestion of ligno-cellulosic material, with chlorine in the presence of at least sufficient water to form a wet paste until said alkali-lignin contains from 15% to 30% of chemically combined chlorine, and reacting said chlorine-treated alkali-lignin with a compound from the group consisting of alkali-metal sulfites, bisulfites, and meta-bisulfites in the presence of water.

6. An aqueous-chlorine-reacted alkali-lignin having a chlorine content of from 15% to 30% and an oxygen content of from about 28% to about 24% reacted with a compound from the group consisting of alkali-metal sulfites, bisulfites, and meta-bisulfites in the presence of water.

7. An oxidized, chlorinated alkali-lignin having a chlorine content of from 15% to 30% and an oxygen content of from about 28% to about 24%, hydrolyzed with an alkali, and reacted with a compound from the group consisting of alkali-metal sulfites, bisulfites, and meta-bisulfites.

8. A tanning composition comprising an oxidized, chlorinated alkali-lignin having a chlorine content of from 15% to 30% and an oxygen content of from about 28% to about 24% and at least 10% basis on its dry weight of sodium sulfite.

WILLIAM B. STODDARD, Jr.

References Cited in the file of this patent

UNITED STATES PATENTS

| Number | Name | Date |
| --- | --- | --- |
| 1,567,395 | Schmidt | Dec. 29, 1925 |
| 1,844,019 | Sailer | Feb. 9, 1932 |
| 2,092,622 | Koch et al. | Sept. 7, 1937 |
| 2,418,981 | Muller | Apr. 15, 1947 |
| 2,491,499 | Katzen et al. | Dec. 20, 1949 |

OTHER REFERENCES

Progress in Leather Science 1920–1945, page 613, pub. 1948. Printing Craft Ltd., Mansfield, Eng.